Oct. 31, 1967

P. J. CLOSMANN 3,349,849

THERMOAUGMENTATION OF OIL PRODUCTION FROM
SUBTERRANEAN RESERVOIRS

Filed Feb. 5, 1965

INVENTOR:
PHILIP J. CLOSMANN
BY: *Joseph J. Strobala*
HIS ATTORNEY 3,349,849
THERMOAUGMENTATION OF OIL PRODUCTION FROM SUBTERRANEAN RESERVOIRS
Philip J. Closmann, Houston, Tex., assignor to Shell Oil Company, New York, N.Y., a corporation of Delaware
Filed Feb. 5, 1965, Ser. No. 430,613
10 Claims. (Cl. 166—40)

This invention relates to the recovery of oil from subterranean oil-bearing reservoirs, and more particularly, to a method of transmitting thermal energy into a limited zone (layer) within an oil-bearing reservoir and then withdrawing fluids from a larger zone (layer) of the reservoir to facilitate the production of oil therefrom.

Even though crude oils are relatively viscous materials, the viscosity of most crudes decrease as the temperature of the crude is increased. Thus, if sufficient thermal energy is added to even a relatively viscous crude, such as those typified by the tars in the Athabasca tar-sands in Canada, it will often convert such a tarry, bituminous material into a mobile liquid which may be caused to flow within the reservoir pores to facilitate its recovery. Also, the non-viscous, comparatively speaking, crudes become even less viscous upon heating and heating them can often enhance the total recovery of these crudes from a reservoir formation.

Since petroleum crudes are often found in reservoirs having relatively small pores, for example "tight" sandstone or limestone, which critically limits flow within these reservoirs, it is often desirable, or even essential, to reduce the viscosity of even the less viscous crudes by heating them, so these crudes can more easily flow through the pores of the reservoir to a collection area from which they can be recovered. The recognition of the net recovery advantages which can be gained by the addition of thermal energy to oil-bearing reservoirs has led to the development of thermal augmentation processes, such as in situ combustion and/or the injection of heated fluids, both of which are capable of heating the crudes in the reservoir formation to facilitate production flow.

Generally, the present invention relates to the use of heated fluids in the recovery of oil from oil-bearing reservoirs and more specifically to the recovery of the oil from the same well or borehole through which the injection is effected. This latter type of process is often referred to as a "backflow" recovery technique. These backflow techniques are distinct from the so-called "drives" in which heated fluids are injected through an input well in order to displace the oil from the vicinity of the input well, and between it and the recovery well, toward a recovery well located at a spaced distance from the input well. The ability of the heated fluid to displace the crudes in the reservoir away from the well through which it is injected causes problems when using backflow recovery techniques since it drives the oil away from the area from which it is to be recovered, i.e., the reservoir contiguous to the well.

In my thermal backflow process a heated fluid is injected through a well under conditions which causes much of the heated fluid to bypass oil in the portion of the reservoir contiguous to the borehole and yet provides a heat sink to warm the oil in the portion of the reservoir that surrounds the borehole without displacing the major portion of this oil to remote locations from the borehole. The so-heated oil is then produced by reducing the pressure within the well below the pore pressure of the formation and allowing fluids to flow from all portions of the formation, including the injection portion, into the well casings. By this technique many of the problems experienced with thermally augmented backflow can be avoided.

The method of the invention is applicable to substantially any oil-bearing permeable reservoir; that is, any oil-containing reservoirs which are, at their natural temperature, at least gas-permeable. It can be used in reservoirs containing a viscous and/or a light (low viscosity) crude. Also, the method of the invention is applicable to reservoirs which are no longer capable of flow from natural expansion, such as may be caused by a loss of pressure resulting from the drainage of some of the oil or gas from the reservoir, or loss of gravity flow. Recovery from such a reservoir, is often referred to as "secondary recovery" and this invention has broad utilization in such secondary recovery operations.

More specifically, the present invention relates to a method of optimizing oil recovery from permeable subterranean, oil-bearing reservoirs penetrated by a borehole which comprises sealing a casing string in the borehole at least to the extent of the borehole's penetration of the reservoir; perforating the casing string and sealant in at least one centrally located portion of the reservoir interval traversed by the casing string; then injecting a heated fluid only in to the centrally located portion of the reservoir interval through the perforations; terminating the injection of the heated fluid and confining the fluid in the reservoir for a period sufficient for the fluid to transfer a portion of its thermal energy to the reservoir; thereafter establishing fluid flow into the casing string along its entire traverse of the reservoir interval, and recovering any fluid flowing into the casing string.

Actually, the establishment of fluid flow into the casing string after the central portion of the reservoir has been injected with a heated fluid could be accomplished either by perforating the casing along its entire length originally and using a straddle packer to restrict the injection of the heated fluids into the central portion, or alternatively, by perforating only in the central portion initially and after the injection of the heated fluid, perforating along the whole interval that the casing string penetrates the reservoir.

One important feature of the present invention is that the heated fluid is added to the reservoir in a manner that the heated oil can be recovered most efficiently and the maximum benefit from the heated fluid can be obtained to facilitate oil recovery. This is effected by forcing the heated fluid to flow into an isolated zone or layer within the central portion of the reservoir so that the zone or layer is bounded by oil-producing portions of the reservoir interval above and below the zone injected. Thereafter it is necessary to establish the flow of fluids back into the well from the entire reservoir interval penetrated by the casing, particularly from zones or layers located both above and below the injected zone and including the zone through which the heated fluid was injected. In some situations it could be desirable to shut-out the injected zone during the backflow, recovering only from layers above and below it.

While the injection of heated fluids, such as steam, is not new, it certainly is not a universal panacea to improved oil recovery, and indeed, the injection of steam or other non-combustible gas in prior backflow recovery methods has often led to a decrease instead of an increase in production rate of the well injected. Loss in production in the prior backflow processes using heated fluids, injected non-selectively, or alternatively injected into only the top or the bottom of a reservoir resulting partly from plugging from flashing off lighter hydrocarbons and/or driving the recoverable crude oil to portions of the reservoir remote from the borehole making backflow difficult, and resulting in low production.

The present invention is based on the discovery that when a heated fluid is forced to flow into the reservoir along a generally centralized zone within only the middle portion of the interval from which oil is produced, preferably a zone having a thickness of from ¼ to ⅓ of that of the reservoir interval, the amount of oil that is thermally mobilized is about twice the amount that is mobilized by the prior procedures for injecting a heated fluid. This is accomplished without displacing much oil away from the borehole. Only the oil that is within the boundaries of the zone swept by the injected heated fluid is displaced outwardly into the reservoir well during the injection operation. Further, on subsequent backflow in order to effectively recover the heated oil adjacent to the swept zone (in the layers above and below the swept zone), it is necessary to expose these non-injected portions of the reservoir contiguous to the borehole to fluid communication with the inside of the casing string so that the warmed oil in these layers can flow into the casing string.

In the preferred practice of the invention, steam is used and it is injected into only a generally centralized thin zone or layer, preferably one that is most suited for the individual reservoir formation being treated. This is usually determined by the thickness of the reservoir interval to a larger extent and a plurality of such zones or layers would be used in thick reservoirs.

Figure 1:
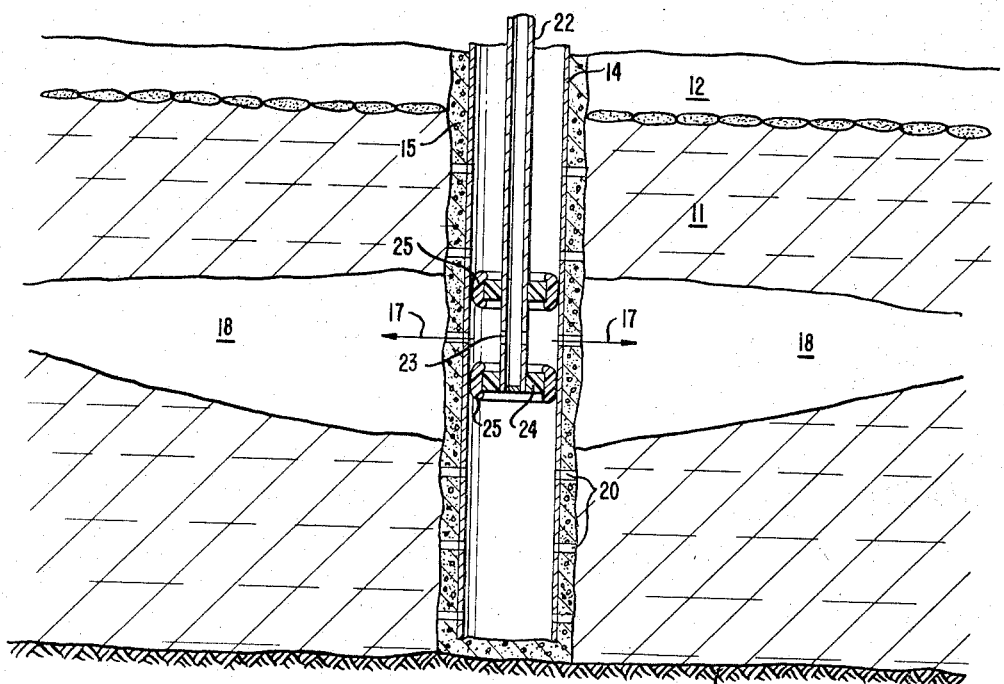
FIGURE 1 is a vertical cross-sectional view of the portion of earth strata which includes a permeable, oil-bearing reservoir penetrated by a borehole and shows the conditions in the reservoir during the injection step of the invention.
Figure 2:
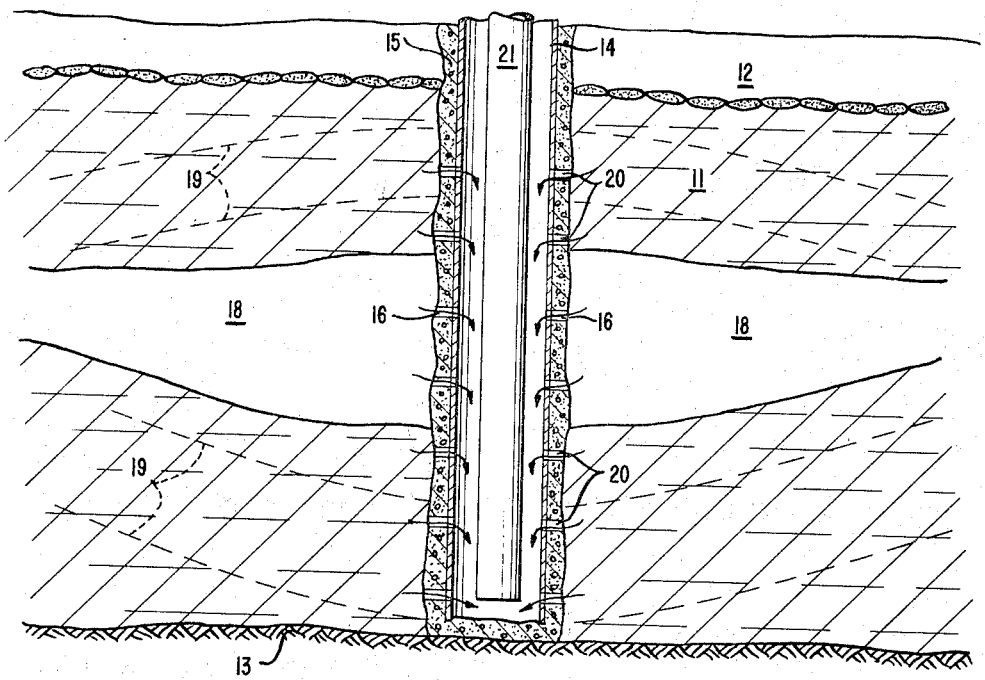
FIGURE 2 is the similar cross-sectional view of the lower portion of the borehole shown in FIGURE 1 showing conditions in the reservoir during the recovery step of the invention.

Referring to FIGURES 1 and 2, showing similar cross-sections of the same reservoir, FIGURE 1 showing the conditions during the injection phase and FIGURE 2 showing the conditions therein during the production phase, the downhole portion of the borehole is shown penetrating a permeable, oil-bearing reservoir stratum 11 sandwiched between an upper impermeable layer 12 and lower impermeable layer 13. In both figures, the borehole is shown with a casing 14 sealed in the borehole with sealant 15, such as cement, in order to seal the borehole from fluid communication with the permeable, oil-bearing reservoir.

Referring specifically to FIGURE 1 and the injection phase of the method to optimize oil recovery from the reservoir, exemplifying a reservoir in which the effect of gravity segregation is insignificant, it can be seen that the casing 14 and sealant 15 are perforated over the entire portion of the permeable reservoir 11, from which oil is to be produced, as indicated by ports 16 and 20. A tubing string 22 is extended from a surface location into the well with its lower end closed except for openings 23 located between a pair of packers 24 that have remotely actuatable sealing means 25. Such an arrangement may comprise a conventional straddle packer assembly. The assembly is run in with the packers open, spotted to straddle the ports 16 in the central portion of the casing 14, and then actuated to close the packers and isolate this selected portion of the casing 14. In this way, the only fluid communication between the inside of tubing string 22 and reservoir 11 is through ports 16.

After the fluid communication of tubing 22 with the reservoir has been established at a selected location in the central portion of the reservoir, steam is injected into the formation via tubing 22 as indicated by arrows 17. Since the steam is injected into only the central portion of the reservoir, it tends to move radially outwardly into the reservoir 11 from casing 14 as indicated empirically by zone 18. Zone 18 is a thin, generally centralized layer having both an upper and a lower boundary located well within the impermeable boundaries 12 and 13 of reservoir 11 from which oil is to be produced. The thickness (vertical) of zone 18 can be controlled to some extent by the perforation interval used for injection with perforation in a single plane giving the thinnest zone or layer.

Since the steam is injected into only the isolated zone 18 in the central portion of reservoir 11 it tends to condense within that portion. Further, any displacement of oil by the injection is limited substantially to the central portion of the reservoir. Thus, any detrimental effects that might have resulted from the contacting of the reservoir system with steam or its condensate, are restricted to this central portion, leaving other portions of the reservoir contiguous to the borehole uneffected. Because the other portions of the reservoir 11 are isolated from contact with the steam and/or its condensate conveyed by the tubing string 22, the steam tends to move more or less radially outwardly into the reservoir as a layer, rather than to diffuse into all of the portions immediately adjacent to the borehole, because the channel through zone 18 will be more permeable. The entry of oil into the borehole through perforations 20 above and below the packers during the injection is prevented by the closures at, respectively, the wellhead (not shown), closing off the annulus between the tubing string 22 and the casing 14 and cement at the bottom of the well and the bottom packer 24 of the straddle packer. As the steam condenses within the zone 18 its heat of condensation is transferred by conduction to the oil along both the upper and the lower boundary of zone 18; of course, any additional heat in the steam will also be transferred to the reservoir system.

After the injection of the steam or other heated fluid has been completed into the isolated zone 18 of the reservoir 11, the tubing string 22 is, generally, closed off in order to retain the heated fluid in the reservoir for a "soak" period. As is known to those skilled in the art, the durations of both the injection period and any soak period that is employed can be varied widely. The purpose of the soak period is to allow most of the thermal energy in the heated fluid, more or less confined in zone 18, to be transferred to the oil and the other components of the reservoir system both above and below zone 18. The thermal energy of the heated fluid heats the formation and the oil and results in a substantial reduction in the viscosity of the oil and, generally, enhances the rate and amount of the oil production since the oil can more easily move through the pores of the reservoir.

After the soak period has been completed and at least a portion of the thermal energy transferred into the non-injected portions of the formation as indicated by temperature gradient lines 19 in FIGURE 2, the well is prepared for oil production. This is, generally, accomplished by establishing fluid communication between a surface location and a plurality of perforations, 16 and 20, along the whole vertical traverse of reservoir 11 by casing 14. These perforations provide a large number of ports through which the heated oil in reservoir 11 may drain into the casing 14, especially from the non-injected layers above and below zone 18.

Since only zone 18 has been injected with the heated fluid during the injection period, any of detrimental effects which were created by the injection, will be limited to zone 18 and the oil in the other portions of reservoir 11 above and below zone 18 can flow quite freely through the perforations 20 since, while not contacted by the injected heated fluid, it is warmed appreciably. Even though the layers of the reservoir 11 above and below zone 18, were not physically contacted by the heated fluid, the thermal energy from the fluid will have been transferred to these portions of the reservoir by conduction from zone 18, thereby warming the oil, lessening its viscosity and improving its mobility.

It is generally desirable to provide the casing 14 with an internal tubing string 21, with associated pumping equipment (not shown) to recover the oil draining into casing 14; however, tubing string 21 may or may not be necessary depending upon the pore pressures within the reservoir. Also, it may be desirable to reduce the pressures inside casing 14 in the reservoir interval substantially below the pore pressures in the reservoir to encourage the oil flow into the casing 14 which can be accomplished with commonly available equipment.

More specifically, this method of optimizing oil recovery from permeable subterranean, oil-bearing reservoirs requires that a borehole penetrate such a reservoir and preferably completely traverse the reservoir in a generally vertical direction. Since the invention requires the injection of heated fluids into only an isolated central portion of the reservoir, it is usually necessary to case the borehole at least to the extent of its traverse of the reservoir and seal the casing in the reservoir with a sealant 15, such as cement.

Possibly, in some instances, open-hole straddle packers could be used, however a heated fluid which is injected between a pair of straddle packers which are closed against an open hole is likely to work its way around the packers, which can only be adjusted to exert a limited pressure because of their tendency to fracture the reservoir formation. Therefore, in most cases the borehole will be cased and have the casing sealed into the formation as indicated above.

Important in the method of the present invention is the disposition of the conduits to provide fluid communication through the perforations 16 of the casing 14 and sealant 15 in only the central portion of the reservoir 11 so as to provide fluid communication between the source of fluid to be injected and only the central portion of the reservoir 11 during the injection of the heated fluid. By this, it is intended that the perforation in the central portion convey the concept of a plurality of perforations located centrally in the reservoir, i.e., in the middle ⅓ of the reservoir and preferably below the middle thereof. Actually, the number of perforations required for the injection of the heated fluid will depend in large measure upon the thickness of the reservoir and perforations can be made at multiple levels within the middle ⅓ of the reservoir formation. In shallow reservoir formations it may be desirable to perforate only at a single level, say slightly below the middle of the reservoir formation, to provide for the injection of the heated fluid, since the heat transfer in the shallow reservoir can be more easily accomplished from the single level than it can be from a single level in thicker reservoirs.

In general, the perforations are located so that the heated fluid can be selectively injected into one or more centrally located, discrete and relatively thin zones (layers) within the reservoir interval. The thickness of a perforated interval of the casing and sealant through which the heated fluid is so injected may range from the thickness of perforations in a single plane to about one-third the thickness of the reservoir interval. Within the boundaries of said centrally located zones (layers) the density of the perforation can be varied as desired; but, when the casing is perforated along the entire reservoir traverse prior to the injection of the heated fluid, the perforations above and below the level to be injected should be spaced to facilitate the sealing of packers that isolate the selected interval. In a thick reservoir, e.g., a 600-foot-thick reservoir, it may be desirable to inject a heated fluid into a plurality of said centrally located zones (layers). In such a thick reservoir, it may be desirable to inject the heated fluid into two or three zones (layers) that are, respectively, one-tenth or one-eighth the thickness of the reservoir and are spaced apart by, respectively, one-sixth or one-fifth the thickness of the reservoir. Thus, zones that are 60 or 75 feet thick are separated by 100 or 120 feet.

One purpose of injecting through perforations in the casing string only in the middle ⅓ of the reservoir is to achieve the most effective heat distribution in the reservoir. The heated fluid injected into the central portion of the reservoir will heat the reservoir layers both above and below the injected zone thereby providing high oil mobility both above and below the injected zone. But, in order to take advantage of this heat distribution, oil from the unpenetrated portions of the reservoir must be allowed to flow into the casing without having to pass through the injected zone during the backflow cycle of the process. Since much of the thermal energy from the heated fluid has been transferred to portions of the reservoir layers both above and below the injected zones by conduction, the heat flow both upwards and downwards from the injected zones being similar, this selection of the central (middle) portion of the reservoir for the injection zone produces a substantial improvement in efficiency.

Generally, the particular heated fluid to be injected into the central portion of the reservoir formation to add thermal energy thereto is selected on the basis of the type of reservoir, the economics of the use of particular fluid and similar factors, but for the most part it can be any gaseous fluid which has good heat-carrying capacity. Examples of such gaseous fluids are steam, methane, ethane, propane, nitrogen, and other inert, non-oxidizing gases. However, for the most part, the invention contemplates the use of steam, or in the alternative, methane or ethane, the latter two having very good heat-carrying capacities. Any of these heated gaseous fluids when injected into the central portion of the reservoir have high mobility with respect to the oil in the reservoir and tend to move radially out into the reservoir in a radial plane flow pattern. Any detrimental effects in the reservoir, caused by the injection of the heated fluid, are restricted to the central, radially extensive portion of the reservoir and will have little if any, effect upon the portions of the reservoir above and below the injected portions although these portions are heated by the fluids in the injected zones through conduction.

The heated fluid is injected at a pressure which exceeds the reservoir fluid pressure in order that the heated fluid will move into the reservoir from the casing. Higher than over-burden pressures can result in dangerous situations since, in some formations, greater than the over-burden pressure can cause blow-outs, especially in shallow reservoirs at depths of less than 500 feet. Generally, in such shallow reservoirs the pressures at which the heated fluid is injected are preferably not more than about 0.7 time the depth of the formation in feet in pounds per square inch. Thus, in a reservoir located at a depth of 500 feet, the injection pressure would be approximately 350 pounds per square inch gauge. In other reservoirs, particularly in relatively deep and relatively low permeability reservoirs, or in reservoirs located where the regional tectonics are conducive to the formation of horizontal fractures, it may be desirable to fracture the said centrally located layer into which the heated fluid is to be injected. The fracturing and/or fracture propping can be accomplished by conventional techniques for selectively inducing and, if desired, propping, a horizontal fracture. In such a situation, it may be desirable to employ steam as the heated fluid to be injected and to effect the fracture by injecting the steam at a pressure exceeding the fracturing pressure of the reservoir formation.

After the heated fluids have been injected into the central portion of the reservoir, the heated fluids are retained in the reservoir for a time sufficient for the heated fluid to transfer at least a portion of its thermal energy to the reservoir, commonly referred to as a "soak period." Of course, this transfer is being accomplished even during the injection period but, in general, a greater and more efficient transfer can be accomplished during a "soak" period.

Subsequent to the completion of the soak period, the fluid communication is extended to casing perforations along the entire traverse of the reservoir so that all levels of the reservoir both above and below, as well as n the central portion (which was injected with the heated fluid) have fluid communication with the inside of the casing. Then an inflow of oil from fluid pressure gradient within the reservoir is created, by lowering the pressure within the casing to less than that within the formation, so that all portions (levels) of the reservoir formation are exposed to the lower pressure gradient existing in the casing.

The subsequent establishment of fluid communication between the reservoir and the inside of the casing string along the entire traverse of the reservoir is one of the important steps of the present invention. This feature exposes portions (levels) of the reservoir which were not subjected to the injection of the heated fluid to fluid communication with the inside of the casing in order that the warmed oil in these portions of the reservoir can readily flow into the casing from which it can be recovered. It is in this manner that the method of this invention is able to optimize the recovery of petroleum for subterranean permeable reservoir formations. Of course, the oil flowing into the casing can be recovered by suitable pumping means and in some cases, it may be desirable to reduce the pressures in the casing to encourage the flow of oil into the casing which can be accomplished with suitable pumping equipment. Naturally, any residual pressures remaining in the well after the soak period can be vented, either before or subsequent to establishing fluid communication of all levels of the reservoir interval with the inside of the casing in order that the backflow of petroleum into the casing will occur.

Substantial advantages are obtained by the use of this method of optimizing oil recovery from permeable subterranean oil-bearing reservoirs which are not possible with known techniques. For example, if the reservoir contains light oil, the injection of a heated fluid across the whole traverse of the reservoir is likely to drive a significant proportion of the light oils in the vicinity of the bore hole to remote locations from the borehole leaving little of the oil in the vicinity of the borehole for backflow during the recovery step. In such cases, the injection of a heated fluid by conventional techniques may actually decrease production rather than increase it. Likewise, when the reservoir contains highly viscous oils, the injection across the whole traverse of the reservoir may tend to flash off lighter hydrocarbons and leave heavier residues in the interstitial voids adjacent to the borehole which restrict the passage of oil during backflow. Through the use of the instant invention, many of these problems are avoided, or at least minimized to the degree where the use of the invention reasonably ensures increased oil production from petroleum reservoirs.

In order that the invention will be more easily understood from a practical point of view, the following example is included for purposes of illustration but not of limitation.

*Example I*

Calculations employing known laws for heat and fluid flow within reservoirs are indicative of the following in respect to oil production operations.

In an oil-bearing reservoir containing a viscous crude and having a vertical thickness of 178 feet and situated between a pair of spaced impermeable strata, where a cased borehole is perforated along the entire thickness of reservoir and steam was injected into this entire reservoir interval; the steam flow tends to be along a layer located at the top of the reservoir bounded at the top by the upper impermeable stratum.

Where steam is injected for 37 days the estimated cumulative production values are those indicated in the table below under the heading "Non-Isolated Steam Zone."

For comparison, a steam backflow production process according to this invention was conducted within the same reservoir formation and is equivalent in all respects, except that the steam is selectively injected into only a 10-foot thick layer that is located near the center of the reservoir interval. Steam is injected for 37 days and in an amount equivalent to that injected into the entire reservoir interval as described above. Fluids from the reservoir are subsequently produced from the entire reservoir interval, the cumulative production values are those indicated below under the heading "Centrally Isolated Steam Zone." The method according to this invention provides an increase of about 38,000 barrels in the oil produced within 400 days of production time, and amounts to an increase of about 35.5 percent in the total amount of oil produced.

| Production Time (Days) | Non-Isolated Steam Zone<br>Cumulative Oil Production (Bbls.) | Centrally Isolated Steam Zone<br>Cumulative Oil Production (Bbls.) |
|---|---|---|
| 100 | 28,000 | 45,000 |
| 200 | 43,000 | 65,000 |
| 400 | 71,000 | 109,000 |

I claim as my invention:

1. A method of optimizing oil recovery from a permeable subterranean, oil-bearing reservoir traversed by a borehole using an injected heated fluid and backflow comprising:
    (a) sealing a casing string in said borehole at least to the extent of said borehole traverse of said reservoir;
    (b) establishing fluid communication between the inside of said casing string and layers of said reservoir contiguous to said casing string at substantially the central layers of said reservoir;
    (c) injecting a presurized heated fluid at a temperature above that of the reservoir and only into said central layers of said reservoir at a pressure sufficient to cause said heated fluid to ingress into said central layers of said reservoir;
    (d) terminating said injecting of said heated fluid into said central layers of said reservoir and allowing the heated fluid to heat soak the reservoir for a time sufficient to transfer at least a portion of its thermal energy to the reservoir;
    (e) subsequently exposing substantially all layers of said reservoir to pressure less than the pore pressure of said reservoir along the entire traverse of said reservoir by said borehole; and
    (f) recovering by backflowing from the same well in which the heated fluid was previously injected effluents entering said casing string from said reservoir.

2. A method according to claim 1 in which the heated fluid injected into the central layers of the reservoir is a gaseous non-oxidizing fluid.

3. A method according to claim 2 in which the heated fluid is steam.

4. A method according to claim 1 in which the fluid communication between the inside of the casing string and the reservoir is established by a plurality of perforations through said casing string and its sealant.

5. A method according to claim 1 in which the injection of the pressurized heated fluid only into the central layers of the reservoir is accomplished by using packers to isolate said central layers and injecting said heated fluid therebetween.

6. A method according to claim 1 in which only the central layers of the reservoir in the middle ⅓ of said reservoir are injected with the heated fluid.

7. A method according to claim 1 in which all the layers of the reservoir contiguous to the borehole are exposed to a pressure less than the pore pressure of said reservoir by establishing fluid communication between the inside of the casing string and substantially all of said layers at a plurality of locations along the borehole's traverse of said reservoir.

8. A method according to claim 7 in which the fluid communication between the inside of the casing string and substantially all the layers of the reservoir contiguous to the borehole is established by perforations above and below the injected central layers of said reservoir.

9. A method according to claim 8 in which the perforations of the casing string above and below the injected layers of the reservoir are formed subsequent to the injection of the heated fluid.

10. A method according to claim 8 in which the perforations above and below the injected central layer of the reservoir are formed before the injection and are closed until after the injection of the heated fluid has terminated.

References Cited
UNITED STATES PATENTS

| | | | |
|---|---|---|---|
| 2,917,296 | 12/1959 | Prentiss | 166—11 X |
| 3,280,909 | 10/1966 | Closmann et al. | 166—2 |

CHARLES E. O'CONNELL, *Primary Examiner.*

STEPHEN J. NOVOSAD, *Examiner.*